United States Patent [19]

Kelley

[11] Patent Number: 4,519,462

[45] Date of Patent: May 28, 1985

[54] CABLE FOLLOWING APPARATUS HAVING CABLE CLEANING CAPABILITIES AND METHOD

[75] Inventor: Douglas P. Kelley, Redmond, Wash.

[73] Assignee: Electric Power Research Institute, Inc., Palo Alto, Calif.

[21] Appl. No.: 414,485

[22] Filed: Sep. 2, 1982

[51] Int. Cl.³ .............................................. E21B 7/18
[52] U.S. Cl. ...................................... 175/53; 175/67; 175/94; 254/134.6
[58] Field of Search ...................... 175/53, 62, 65, 67, 175/94, 95; 254/106, 134.6, 134.3 R, 134.3 FT, 134.5; 15/104.04, 104.03; 405/184

[56] References Cited

U.S. PATENT DOCUMENTS

| | | | |
|---|---|---|---|
| 2,776,816 | 1/1957 | Jackson | 175/71 |
| 4,091,631 | 5/1978 | Cherrington | 175/62 |
| 4,385,667 | 5/1983 | Reichman et al. | 175/53 |
| 4,403,667 | 9/1983 | Reichman et al. | 175/230 |

Primary Examiner—James A. Leppink
Assistant Examiner—Hoang C. Dang
Attorney, Agent, or Firm—Flehr, Hohbach, Test, Albritton & Herbert

[57] ABSTRACT

A cable following apparatus especially suitable for replacing existing underground cable is disclosed herein. This apparatus includes a tubular main body disposed around and movable along a particular cable in a forward direction while an arrangement of water jets are used to cut through the soil surrounding the cable in front of the forwardly moving main body. At the same time, a high pressure stream of air or similar gas is directed into a circumferential area between the front end of the main body and the cable in a way which is intended to prevent particulate material from passing therebetween and damaging or otherwise disrupting operation of the apparatus.

13 Claims, 2 Drawing Figures

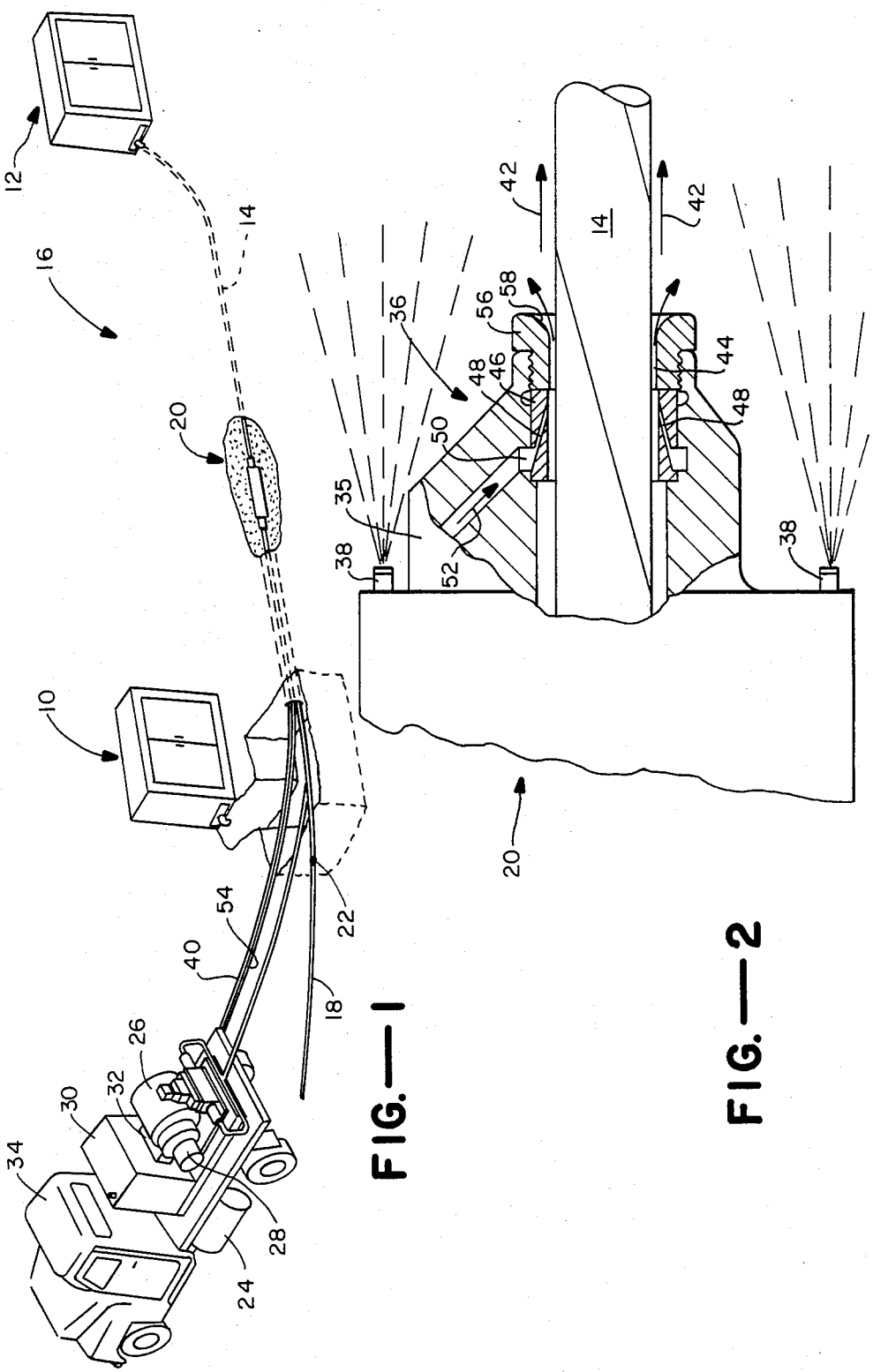
FIG.—1
FIG.—2

CABLE FOLLOWING APPARATUS HAVING CABLE CLEANING CAPABILITIES AND METHOD

The present invention relates generally to cable following apparatus especially suitable for use in replacing an existing underground cable and more particularly to improvements in the cable following apparatus disclosed in U.S. patent application Ser. No. 196,847, filed Oct. 14, 1980 on behalf James M. Reichman, et al.

The cable following apparatus disclosed in the Reichman et al patent application which is incorporated herein by reference includes a telescopically slidable tubular body positioned around a given cable. A cable gripping arrangement is provided for interconnecting this tubular body with and causing it to move in a forward direction along the given cable. At the same time, a group of high pressure fluid jets using for example a bentonite slurry or even water are located at the front end of the tubular body for cutting through the soil surrounding the cable in front of the tubular body as the latter moves in its forward direction.

While the overall apparatus just described is generally satisfactory for its intended purpose, there is a tendency for some of the loosened soil, in the form of particulate material, to pass into the tubular body between the latter and the cable from its front end. If any incoming particulate material is hard enough and/or large enough, it could damage the cable surrounded by the apparatus, thereby disrupting operation of the apparatus, for example by preventing the latter from moving forward relative to the cable.

In view of the foregoing, it is a primary object of the present invention to reduce and preferably eliminate the possible problem just recited.

A more specific object of the present invention is to provide a cable following apparatus designed to minimize and preferably prevent entry of particulate material into the area between the cable being followed and its tubular body is an uncomplicated and yet reliable way.

These and other objects are achieved by directing a high pressure stream of gas, specifically air, into the circumferential area between the cable and a front section of its main body at a predetermined orientation relative to the movement of the main body and at relatively high pressure. This has been found to substantially reduce the possibility of and hopefully entirely prevent entry of particulate material into that area where such material may ultimately damage the apparatus or disrupt its operation, as stated previously.

The overall cable following apparatus and the particular way in which it achieves the foregoing objects will be described in more detail hereinafter in conjunction with the drawing wherein:

FIG. 1 is a diagrammatic illustration in perspective view of an overall system for replacing underground cable including the utilization of a cable following apparatus designed in accordance with the present invention; and FIG. 2 is an enlarged, partially broken away side view of a front end section of the cable following apparatus illustrated in FIG. 1.

Turning now to the drawings, attention is first directed to FIG. 1 which diagrammatically illustrates two spaced transformer stations generally indicated at 10 and 12 and an underground cable 14 extending therebetween. FIG. 1 also diagrammatically illustrates a system generally indicated at 16 for cutting through or otherwise loosening the soil around and along the length of cable 14 for making it relatively easy to pull out and replace the latter with a new cable 18. In order to accomplish this, overall system 16 includes cable following apparatus 20 also referred to as a cable follower which is interconnected with the slides along cable 14 from transformer station 10 to transformer station 12. The cable follower carries with it the necessary means for cutting through or otherwise loosening the soil around and along the length of the underground cable. Once the cable follower reaches station 12 from station 10, cable 14 can be readily pulled out of the ground from one end, for example from station 12 utilizing a suitable device such as a power winch. At the same time, one end of replacement cable 18 can be fastened to the other end of cable 14, for example at station 10, as indicated generally at 22. In this way, as cable 14 is pulled out of the ground, cable 18 is pulled into the ground in its place.

In a preferred and actual working embodiment of the present invention, system 16 utilizes liquid, preferably water, under pressure to loosen the soil around and along the length of cable 14 and hydraulic action to move the cable follower. By utilizing water or other suitable liquid jets to cut around and along the length of the cable, the liquid combines with the loosened soil to form a slurry which surrounds the cable. This helps to maintain the cable in a relatively loose position underground and serves to prevent the ground above the cable from collapsing before the cable can be removed. In this regard, it should be pointed out that the soil initially surrounding the cable is usually relatively free of large rocks and boulders since the cable as originally installed was most likely placed in an open trench backfilled with soil. This, of course, makes it easier to ream around the cable by means of water jets or the like. Both the water under pressure and the hydraulic fluid, preferably oil, can be portably brought to station 10. As illustrated in FIG. 1, overall system 16 includes a source of high pressure water, that is, a water tank generally indicated at 24 and an electrically powered or engine powered water pump 26 for providing water jets for cutting around the soil. The system also includes a hydraulic pump 28 along with a supply of hydraulic fluid 30 and suitable control valves generally indicated at 32, all of which are provided for powering the cable following apparatus. All of these components, that is, the source of high pressure water and the hydraulic components can be carried to the site on a truck 34.

As indicated above, cable following apparatus 20 is caused to advance in a forward direction along cable 14 and, at the same time, is provided with a series of water jets at its front end for cutting through or otherwise loosening the soil surrounding the cable. A specific cable following apparatus which accomplishes both of these functions is disclosed in the previously recited Reichman et al application which, as stated, has been incorporated herein by reference. Accordingly, it is not necessary to provide a detailed description of the overall apparatus, except of course as it relates to the present invention. To this end, FIG. 2 illustrates a front end section of the cable following apparatus and specifically shows the front end 35 of its main body 36 which is generally tubular in configuration and which is disposed around cable 14. This tubular body carries with it a number of water jets 38 corresponding in function to those described in Reichman et al and interconnected with its water source on truck 34 via suitable means such as conduit 40.

In order for tubular body 36 to move in a forward direction along cable 14 as indicated by arrows 42, it should be apparent that either its front end 35 must slide over the outer surface of the cable or it must be spaced therefrom. As illustrated in FIG. 2, front end 35 (and in fact all of the tubular body) is disposed circumferentially around and spaced from the cable, thereby defining a front circumferential area 44 between front end 35 and the cable. It should also be apparent that there is a tendency for particulate material in front of the cable following apparatus to enter area 44 from its front end as the apparatus advances along the cable. As will be seen hereinafter, overall apparatus 20 includes an uncomplicated and yet reliable arrangement of components for substantially reducing and preferably eliminating this possibility.

The components just mentioned include a nozzle ring 46 removably disposed within a cooperating opening in the front end of tubular body 36 concentrically around and radially spaced from cable 14, as illustrated in FIG. 1. This ring contains a plurality of circumferentially spaced jetways 48 which extend through the ring's main body at downward and forward angles from their back ends to their front ends. The rearward ends of these jetways are disposed in fluid communication with an annular manifold 50 provided in tubular body 36 and the manifold is placed in fluid communication with an inlet passageway 52 which extends through the tubular body to the back end of the latter where it is placed in fluid communication with a conduit 54. This conduit connects the passageway with a suitable supply of pressurized air (not shown) carried on truck 34. The nozzle ring 46 is fixedly maintained in the position illustrated by means of an annular nozzle retainer 56 disposed immediately in front of the ring within the front opening of tubular body 36 in a tight fitting but not necessarily bonded fashion so that the nozzle ring can be readily replaced if necessary.

With the nozzle ring and retainer positioned in the manner just described, air under pressure is directed through the jetways 48 and into circumferential area 44 in the form of air jets 58. As seen in FIG. 2, these air jets pass through area 44 in a forward direction and out the front end of the retainer. The air jets serve to minimize and preferably eliminate entry of particulate material into area 44 from the front of the retainer. Obviously, the stronger these air jets are, the more remote it is that any particulate material will find its way into area 44 from its front end. This means that the interior of the housing surrounding cable 14 is protected from incoming particulate material.

In an actual working embodiment, the pressure at the air supply is 90 PSI for feeding the individual jetways. These specific air jets enter area 44 at an angle of 15° with the axis of cable 14. While these specific parameters are not intended to limit the present invention, they are provided for exemplary purposes. Moreover, it is to be understood that other gases besides air may be utilized for the same purpose. However, it has been found that water jets and probably other liquids do not function nearly as well.

As stated previously, retainer 56 is provided to fix nozzle ring 46 in place. In addition, the retainer is designed to reduce surface friction as the overall cable following apparatus encounters a turn. This is accomplished by providing the retainer with a front end section which is disposed in front of the main body and which has a circumferential forwardmost face defining an outwardly flairing radius of curvature. In the actual working embodiment mentioned above, face 58 has a radius of curvature of 3/16". In addition, the overall retainer is preferably constructed of a relatively hard material, for example stainless steel to prevent galling against concentric neutrals (not shown) disposed around some cables (specifically underground electrical power cables).

What is claimed is:

1. An apparatus for cutting through the soil around and along the length of an underground cable for removing the latter, said apparatus comprising: a tubular main body adapted for positioning around said cable, said main body including a front end and a back end; means for causing said main body to move in a forward direction along the length of said cable after said main body has been placed around the latter; means for cutting through the soil surrounding said cable in front of said main body as the latter moves along said cable; and means for directing a plurality of streams of gas toward said cable from points spaced circumferentially around the cable and radially outward therefrom and at sufficient pressure to substantially reduce the entry of particulate material into said circumferential area and possibly lodging between the cable and main body in a way which would prevent the latter from moving along the cable or otherwise damaging the cable and/or apparatus.

2. An apparatus according to claim 1 wherein said streams are directed towards said cable in forward inclined directions.

3. An apparatus according to claim 1 wherein said cutting means includes means for applying a high pressure stream of fluid in front of said main body as the latter moves along said cable.

4. An apparatus according to claim 3 wherein said fluid is water.

5. An apparatus according to claim 1 wherein said directing means includes a nozzle insert removably mounted in the front end of said main body and means for retaining the insert therein.

6. An apparatus according to claim 5 wherein said retaining means includes a front end section disposed in front of said main body and having a circumferential forwardmost face defining an outwardly flairing radius of curvature which serves to reduce surface friction as said main body encounters a turn.

7. An apparatus for cutting through the soil around and along the length of an underground cable for removing the latter, said apparatus comprising: a tubular main body adapted for positioning around said cable, said main body including a front end and a back end; means for causing said main body to move in a forward direction along the length of said cable after said main body has been placed around the latter; means for cutting through the soil surrounding said cable in front of said main body as the latter moves along said cable; and means including a plurality of orifices disposed in spaced relationship relative to one another circumferentially around said cable between the latter and a front end section of said main body for directing an equal plurality of pressurized gas streams toward said cable whereby to substantially reduce the entry of said particulate material into the area between said cable and main body from the front end of the latter as said main body moves along said cable.

8. An apparatus according to claim 7 wherein said cutting means includes means for applying a plurality of high pressure streams of water in front of said main body as the latter moves along said cable.

9. A method of cutting through the soil around and along the length of an underground cable for removing the latter, said method comprising the steps of: positioning a tubular main body having a front end and a back end around said cable; causing said main body to move in a forward direction along the length of said cable after said main body has been placed around the latter; cuting through the soil surrounding the cable in front of said main body as the latter moves along said cable; and directing a stream of air into a circumferential area between said cable and a front section of said mainbody at a predetermined orientation relative to the movement of said main body and with sufficient pressure to substantially reduce the entry of particulate material into said circumferential area and possibly lodging between the cable and main body in a way which would prevent the latter from moving along the cable or otherwise damage the cable and/or apparatus, said air being directed into said circumferential area from a plurality of streams toward said cable from points spaced circumferentially around the cable and radially outwardly therefrom.

10. A method according to claim 9 wherein said streams are directed toward said cable at a forward incline and wherein said step of cutting the soil around the cable is accomplished by applying at least one high pressure stream of water in front of said main body as the latter moves along said cable.

11. An apparatus for cutting through the soil around and along the length of an underground cable for removing the latter, said apparatus comprising: a tubular main body adapted for positioning around said cable, said main body including a front end and a back end; means for causing said main body to move in a forward direction along the length of said cable after said main body has been placed around the latter; means for cutting through the soil surrounding said cable in front of said main body as the latter moves along said cable; and means for directing a stream of gas into a circumferential area between said cable and a front section of said main body at a predetermined orientation relative to the movement of said main body and at sufficient pressure to substantially reduce the entry of particulate material into said circumferential area and possibly lodging between the cable and main body in a way which would prevent the latter from moving along the cable or otherwise damaging the cable and/or apparatus, said directing means including a nozzle insert removably mounted in the front end of said main body and means for retaining the insert therein.

12. An apparatus according to claim 11 wherein said retaining means includes a front end section disposed in front of said main body and having a circumferential forwardmost face defining an outwardly flairing radius of curvature which serves to reduce surface friction as said main body encounters a turn.

13. An apparatus for cutting through the soil around and along the length of an underground cable for removing the latter, said apparatus comprising: a tubular main body adapted for positioning around said cable, said main body including a front end and a back end; means for causing said main body to move in a forward direction along the length of said cable after said main body has been placed around the latter; means for cutting through the soil surrounding said cable in front of said main body as the latter moves along said cable, said cutting means including means for applying a high pressure stream of fluid in front of said main body as the latter moves along said cable; and means for directing a pressurized air into a circumferential area between said cable and front section of said main body at a predetermined orientation relative to the movement of said main body and at sufficient pressure to substantially reduce the entry of particulate material into said circumferential area and possibly lodging between the cable and main body in a way which would prevent the latter from moving along the cable or otherwise damaging the cable and/or apparatus.

* * * * *